No. 862,004. PATENTED JULY 30, 1907.
L. G. McCONACHIE.
DEVICE FOR TEACHING PENMANSHIP.
APPLICATION FILED OCT. 31, 1906.
2 SHEETS—SHEET 1.
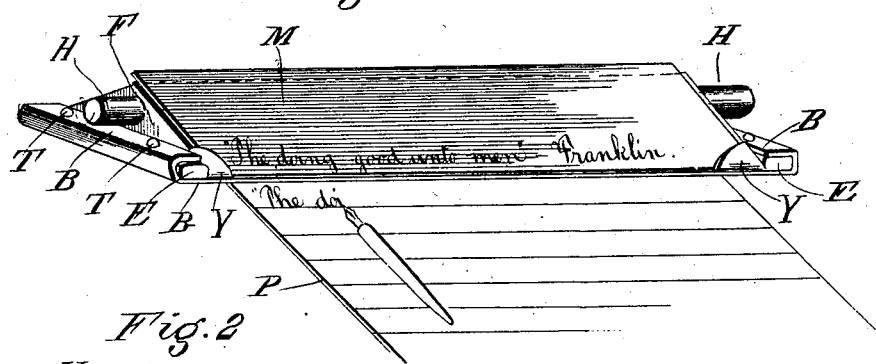
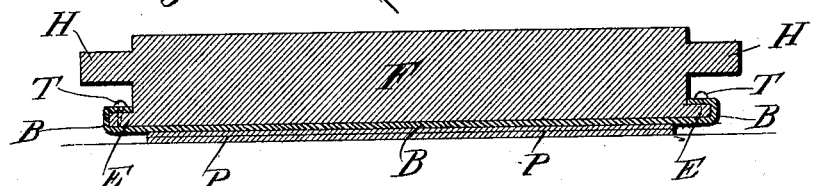
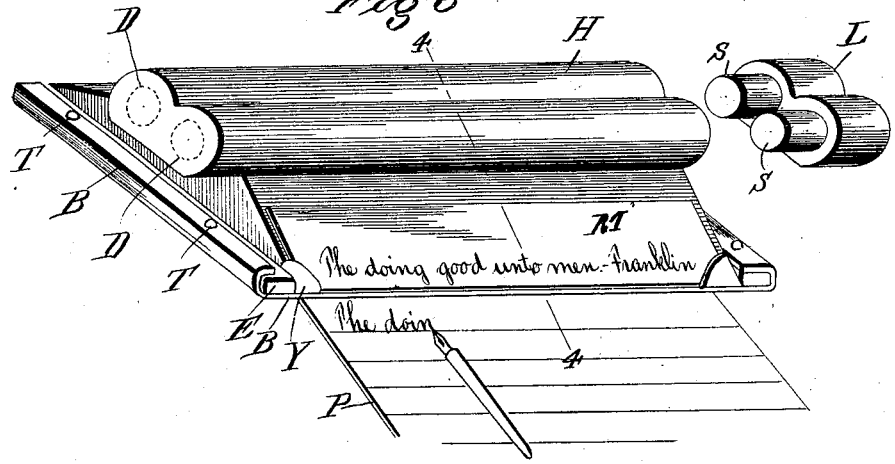
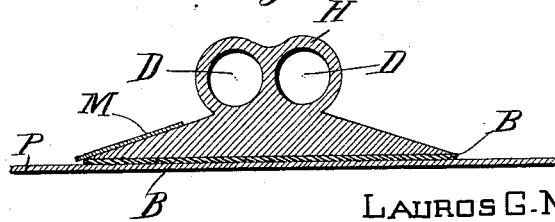
WITNESSES
INVENTOR
LAUROS G. McCONACHIE
BY
ATTORNEYS No. 862,004. PATENTED JULY 30, 1907.
L. G. McCONACHIE.
DEVICE FOR TEACHING PENMANSHIP.
APPLICATION FILED OCT. 31, 1906.
2 SHEETS—SHEET 2.
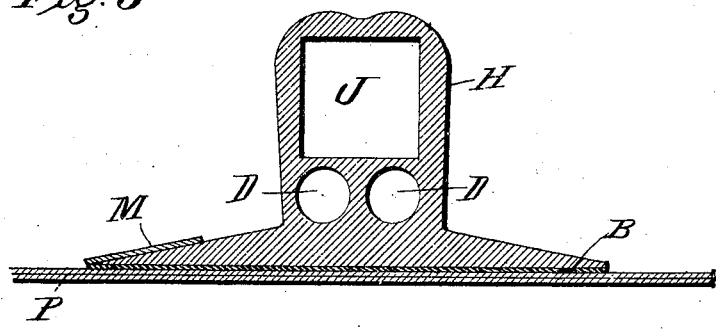
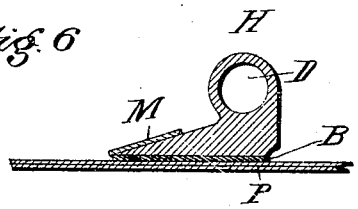
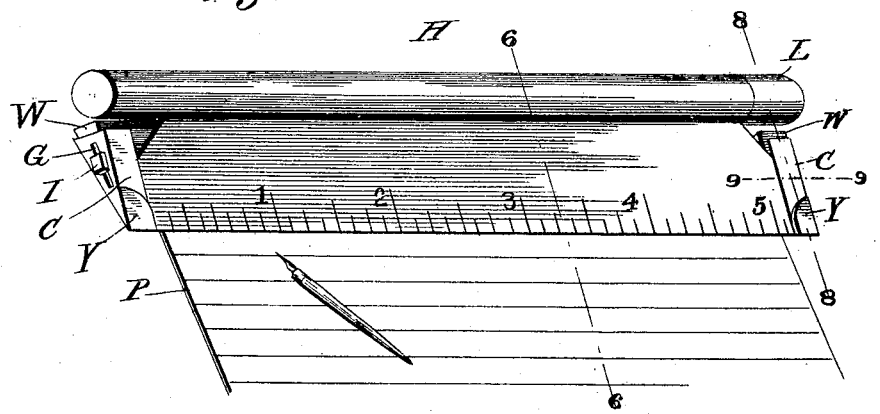
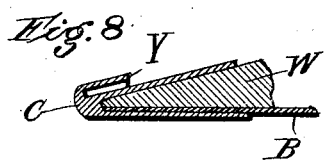
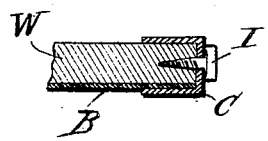
WITNESSES
INVENTOR
LAURDS G. McCONACHIE
BY
ATTORNEYS

UNITED STATES PATENT OFFICE.

LAUROS G. McCONACHIE, OF MADISON, WISCONSIN.

DEVICE FOR TEACHING PENMANSHIP.

No. 862,004.　　　　Specification of Letters Patent.　　　　Patented July 30, 1907.

Application filed October 31, 1906. Serial No. 341,441.

*To all whom it may concern:*

Be it known that I, LAUROS G. MCCONACHIE, a citizen of the United States, residing at Madison, in the county of Dane and State of Wisconsin, have invented a new and Improved Device for Teaching Penmanship, of which the following is a specification.

In the ordinary school copybook used in teaching penmanship each page contains an engraved headline or model and a dozen or more lines underneath upon which the pupil endeavors to reproduce the copy. This arrangement has the following disadvantages:

1. The child, as he proceeds down the page, tends to copy, not the model headline, but the line of his own writing immediately above. The farther down he gets, the more difficulty he has in keeping mind and eye at the same time upon the separating pen and headline. The result is confusion and often distinct progress from bad to worse.

2. The child, too, with a natural instinct for variety, feels the monotony of copying the same words over and over and hastens impatiently to the bottom of the page in order that he may come to the new set of words on the next page.

3. To the average child a blotter is a nuisance and a superfluity. He loses it readily. Under the old system of teaching, he is trained with difficulty to the constant use thereof.

4. The teacher does not have sufficient facility of control over the use of the model headlines. If detached from the copybook and kept in his possession, he could hold before the pupil the incentive of a new copy when satisfactory attainments should be reached with the one in hand; or, if thought best, could issue and permit a new copy for every new line.

5. With the present copybook system, all the pupils in a class have exactly the same model as to size of letters, slant of letters, etc. No allowance can be made for the physical differences of the pupils, the differences in the sizes and shapes of their hands, the lengths of their arms, etc.

6. The present system is more expensive than need be. If the model headlines are detached from and independent of the copybook, one set serves by distribution in a class where a score or more sets would be required, and the space in the copybook now occupied by the headlines may furnish additional space for writing. Also the same models may be used for different classes and for successive years with the result of a great saving in the cost of producing the book and in the purchase price.

7. Since the present copybook model is usually on the same level with the space upon which the pupil writes, his eye follows pen and model with more difficulty than if the model were elevated to an obtuse angle with the space.

Efforts have been made heretofore to overcome some of these objections by providing separate model strips interchangeably mounted on a suitable holder, and while I do not claim broadly this idea of the separate and interchangeable use of the model strips, my invention provides a simple and compact article of novel form operating on this general principle and characterized by the following advantages:

1. It keeps the model line constantly as close to the child's pen as possible.

2. It hides from his eye his own previous efforts.

3. It induces the constant and regular use of the blotter by connecting it inseparably with the model.

4. It cheapens the cost of material by making one model serve in the place of many.

5. It puts the use of the model within the teacher's complete control by detaching it from the copybook.

6. It enables the teacher to test the pupil with models different in size of letters, slant of letters, etc., until he discovers the model best suited to the child's physical qualities, such as size of hand, length of arm, etc.

7. It relieves the pupil of the monotony of a set task of copying the same thing over and over too many times and 8. It elevates the model to a slight angle with the space on which the pupil is writing.

My invention consists in the novel construction and arrangement of parts, which I will now proceed to describe with reference to the drawings, in which Figure 1 is a perspective view of a simple form of the holder. Fig. 2 a vertical longitudinal section of Fig. 1. Fig. 3 is a perspective view of a form in which a handle is superimposed upon the truncated triangular block and hollowed out as a case for pen holder and pencil and showing also the paper sheet. Fig. 4 is a cross-section of Fig. 3 on the line 4—4. Figs. 5 and 6 are similar cross-sections showing modified forms. Fig. 7 is a perspective view of the form represented by Fig. 6, showing also the paper sheet. Figs. 8 and 9 are sectional detail views of the wedge shaped clips shown at C C in Fig. 7.

Similar letters of reference indicate the same parts in all the figures.

In Fig. 1, M is one of a set or series of strips or cards each containing near the edge of one or both of its faces a single model line of writing for reproduction by the pupil; F is a holder upon which it rests. This holder may be made either solid or hollow. As shown it is made solid of wood and is triangular in cross-section; Y Y are pockets attached to F and receiving the corners of the model card M; H H are projecting handles arranged at the ends of the holder F for moving it forward to a new line and pressing it down in the act of blotting; E E are end projections of the bottom of the holder F for attachment of the ends of the blotter B, whose ends are curled up around said projections and fastened by the tacks T T; P is the copybook or other writing paper. The model M hides the edge of the holder which is ruled into graduations for drawing lines and measuring, as seen in Fig. 7. The entire holder may be of one piece, turned in wood, or molded of metal.

In Fig. 3, the handle H extends the full length of the appliance and is bored so as to give two cylindrical chambers D D for pencil and pen holder; it opens at one end by means of the closure plug L which has two solid stopper-like projections S S, corresponding in size and shape with the openings D D of the handle and intended to be inserted in them for closing the cases. The containing chambers may take various forms and be of varying numbers and sizes as seen in Figs. 5 and 6.

Figs. 4, 5, and 6 are drawn for convenient actual widths of the holders; the width of Fig. 5 is that of the blotter in common use, about four inches; the width of Fig. 6 is that of an ordinary ruler, about one and a quarter inches. In Fig. 5, the large opening J in the handle H is intended to hold a set of model line strips. Fig. 7, of which Fig. 6 is a cross-section along the dotted line 6—6, may be said to be the reshaping of an ordinary ruler to make thereof a combination blotter holder, copy holder, pen holder case and ruler in accordance with my invention.

The end projections of the bottom of the holder for attachment of the ends of the blotter may be the same in Fig. 7 as in Figs. 1 and 3; or, said ends may be wedge-shaped and two small clips of metal may fit over them for fastening the blotter and holding the model line strip, as shown by C C in Fig. 7 and by their cross-sections, Figs. 8 and 9. Fig. 8 is a cross-section of this wedge-shaped clip along the dotted line 8—8 of C in Fig. 7 and Fig. 9 is a cross-section along the dotted line 9—9 of C in Fig. 7. In these figures W is the wedge-shaped end of the ruler holder; C is the metal clip; B is the blotter; Y is the pocket for insertion of the corner of the model slip M; and I is a screw or tack for holding the metal clip in place on the end of the ruler. The metal clip slides forward and backward upon this tack I by means of the slot G, shown in Fig. 7, and the clip has upper and lower angular flanges. When the blotter is to be removed, the clip is pushed forward; when the blotter is to be fastened in place, the clip pushed backward over the wedge-shaped end of the holder.

The flat horizontal under surface of the holder may be of various lengths and widths; e. g., the length and width of an ordinary blotter, about nine and a half by four inches; or, the length of an ordinary copybook and the width of an ordinary ruler, about eight and a half by one and a quarter inches. The handle also may take various shapes.

I claim

1. The device for teaching penmanship, comprising the combination of a blotter, a model line strip and a holder for both having wedge-shaped ends and wedge-shaped clips adjustably secured over the wedge-shaped ends of the holder for fastening the blotter and receiving the ends of the model line strip.

2. In a device for teaching penmanship, a body part having wedge-shaped ends, wedge-shaped clips for fastening two sheets of paper or other material together at an angle with each other consisting of upper and lower angular flanges inclosing the wedge-shaped ends of the body part and having slotted ends and set screws passing through said slotted ends into the body part.

3. In a device for teaching penmanship, a model strip holder having wedge-shaped ends and wedge-shaped clip devices inclosing the ends of the same to secure detachable strips to the faces of the holder and means for securing the clip devices.

4. The device for teaching penmanship comprising the combination of a blotter, a model line strip and a holder for both, said holder being rounded to a cylindrical form in its upper part.

5. The device for teaching penmanship comprising the combination of a blotter, a model line strip and a holder for both, said holder being in its upper part in the form of a hollow cylinder opening at one end and provided with a stopper.

6. The device for teaching penmanship comprising the combination of a blotter, a model line strip and a holder for both, said holder having its upper face surmounted in the direction of its length by a hollow cylindrical part provided with a stopper.

7. In a device for teaching penmanship, a model strip holder having a graduated scale on its upper face and surmounted in the direction of its length by a hollow cylindrical part provided with a stopper.

8. In a device for teaching penmanship, comprising the combination of a blotter, a model line strip and a holder for both having wedge-shaped ends and wedge-shaped clips adjustably secured over the wedge-shaped ends of the holder, the wedge-clip having flanges Y Y for insertion of the corners of the model line strip.

LAUROS G. McCONACHIE.

Witnesses:
   Mrs. WALTER ALFORD,
   GEO. H. SHORT.